United States Patent
Appelbaum (10) Patent No.: US 10,065,519 B1
(45) Date of Patent: Sep. 4, 2018

(54) LOCATION POWER MONITORING AND CHARGE DISTRIBUTION USING INTELLIGENT ELECTRIC VEHICLE SUPPLY EQUIPMENT

(71) Applicant: EVERCHARGE, INC., San Francisco, CA (US)

(72) Inventor: Jason Appelbaum, Emeryville, CA (US)

(73) Assignee: EVERCHARGE, INC., San Francisco, CA (US)

( * ) Notice: Subject to any disclaimer, the term of this patent is extended or adjusted under 35 U.S.C. 154(b) by 160 days.

(21) Appl. No.: 15/283,182

(22) Filed: Sep. 30, 2016

Related U.S. Application Data (60) Provisional application No. 62/235,041, filed on Sep. 30, 2015.

(51) Int. Cl.
*H02J 7/00* (2006.01)
*B60L 11/18* (2006.01)

(52) U.S. Cl.
CPC .............................. *B60L 11/1844* (2013.01)

(58) Field of Classification Search
CPC .. H02J 7/0068; H02J 3/18; H02J 13/00; H02J 50/00; H02J 7/027
USPC .......................................... 320/109, 119, 135
See application file for complete search history.

(56) References Cited

U.S. PATENT DOCUMENTS

| | | | | |
|---|---|---|---|---|
| 2009/0062967 | A1* | 3/2009 | Kressner | B60L 11/14 700/286 |
| 2012/0049795 | A1* | 3/2012 | Dougherty | B60L 11/1816 320/109 |

\* cited by examiner

*Primary Examiner* — Nghia Doan
(74) *Attorney, Agent, or Firm* — Renaissance IP Law Group, LLP; David A. Crowther (57) ABSTRACT

Embodiments include an intelligent electric vehicle supply equipment (EVSE) unit. The intelligent EVSE unit includes a communication port to receive an active power load value and a maximum installed power load value from an external power meter. The intelligent EVSE unit includes a buffer-reduced maximum installed power logic section to receive a safety buffer value, to receive the maximum installed power load value from the communication port, and to generate a buffer-reduced maximum installed power value dependent on the safety buffer value and the maximum installed power load value. The intelligent EVSE unit includes a real-time power availability logic section to generate an available power value dependent on the buffer-reduced maximum installed power value and the active power load value. The intelligent EVSE unit includes a power regulator to control an amount of power made available to charge one or more electric vehicles dependent on the available power value.

16 Claims, 6 Drawing Sheets

LOCATION POWER MONITORING AND CHARGE DISTRIBUTION USING INTELLIGENT ELECTRIC VEHICLE SUPPLY EQUIPMENT

RELATED APPLICATION DATA

This application claims the benefit of U.S. Provisional Patent Application No. 62/235,041, filed on Sep. 30, 2015, the contents of which are hereby incorporated by reference.

FIELD

This disclosure relates to location power monitoring and charge distribution, and, more particularly, to home and building power monitoring and charge distribution using intelligent electric vehicle supply equipment (EVSE).

BACKGROUND

The adoption of electric vehicles, plug-in hybrid electric vehicles, and the like, continues at a rapid pace. As the deployment of electric vehicles increases, the charging infrastructure must be adapted to meet demand. Houses and buildings typically have a predetermined maximum amount of power load installed and available for use. A variety of devices draw power from the predetermined load such as lights, appliances, heating systems, air-conditioners, and the like. As electric vehicles become more widely adopted, the load that is placed on the electrical infrastructure of the home or building increases. If not properly monitored and distributed, the maximum load can be exceeded, which can cause circuits to trip, devices to malfunction, and can even result in dangerous conditions or accidents.

Accordingly, a need remains for improved methods and systems for monitoring home or building power usage and intelligently distributing energy. Embodiments of the invention address these and other limitations in the prior art.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first electric vehicle could be termed a second electric vehicle, and, similarly, a second electric vehicle could be termed a first electric vehicle, without departing from the scope of the inventive concept.

Like numbers refer to like elements throughout. The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Reference is often made herein to "electric vehicles." It will be understood that such vehicles can include plug-in hybrid vehicles, pure electric vehicles, an electric golf cart, an electric scooter, an electric bike, an electric skateboard, a SEGWAY®, or any one of a variety of vehicles that operate or move using at least some electricity.

Figure 1A:
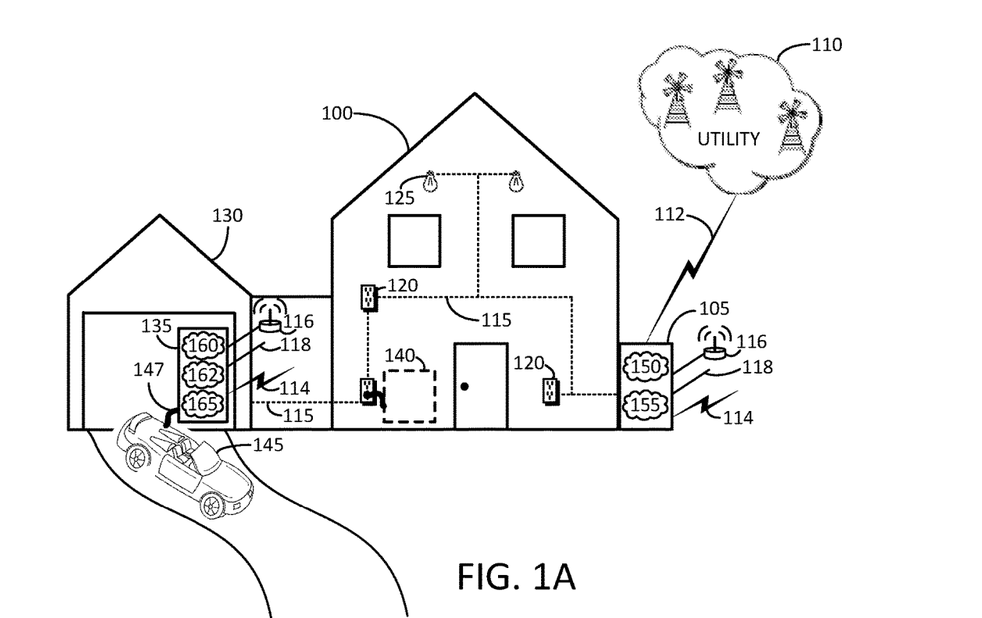
FIG. 1A illustrates an example block diagram of a home including electrical infrastructure and an intelligent electric vehicle supply equipment (EVSE) unit in accordance with various embodiments of the present invention.

FIG. 1A illustrates an example block diagram of a home 100 including electrical infrastructure (e.g., 105, 115, 120, 125, and 140) and an intelligent electric vehicle supply equipment (EVSE) unit 135 in accordance with various embodiments of the present invention. The home 100 can include a power meter 105. The home 100 can include a garage or car port 130. The garage or car port 130 can include the intelligent EVSE unit 135. The intelligent EVSE unit 135 can be electrically and/or communicatively coupled to the home power meter 105. For example, the intelligent EVSE unit 135 can be electrically and/or communicatively coupled to the home power meter 105 via the electrical wiring 115. Alternatively or in addition, the intelligent EVSE unit 135 can be electrically coupled to the home power meter 105 via the electrical wiring 115, while the EVSE unit 135 is communicatively coupled to the home power meter 105 through an out-of-band communication link. For example, the intelligent EVSE unit 135 can be communicatively coupled to the home power meter 105 via an out-of-band communication link such as a wireless link 116 or out-of-band wired connection 118. In some embodiments, a direct electrical connection 114 exists between the home power meter 105 and the intelligent EVSE unit 135. The home power meter 105 can be electrically coupled to a utility 110 via power line 112, which can generate power for use by the home 100.

The electrical infrastructure of the home 100 can include, for example, the home power meter 105, electrical wiring 115, plug outlets 120, lighting devices 125, appliances 140, or the like. It will be understood that other kinds of devices can be used such as circuit breakers, rectifiers, inverters, transformers, or the like (not shown).

The intelligent EVSE unit 135 can be electrically coupled to the electric vehicle 145 via power cord 147. The intelligent EVSE unit 135 can be communicatively coupled to the home power meter 105 either wirelessly or via a wire. The intelligent EVSE unit 135 can receive an active power load value 150 from the home power meter 105. The active power load value 150 can indicate an instantaneous power level presently being delivered to the home 100. The intelligent EVSE unit 135 can receive a maximum installed power load value 155 from the home power meter 105. Alternatively or in addition, the intelligent EVSE unit 135 can be manually programmed with the maximum installed power load value 155.

The maximum installed power load value 155 can include a maximum amount of power capable of being delivered via the electrical infrastructure of the home 100. For example, if the home 100 includes ten (10) twenty (20) Amp circuits, then at one hundred twenty (120) Volts, the maximum installed power load 155 can be 24 kVA (i.e., Kilowatts). This is only a theoretical maximum since a safety buffer should exist such that the electrical infrastructure is not overloaded, which could otherwise cause a safety hazard. The intelligent EVSE unit 135 can automatically determine a safety buffer value 162 such as 20%. Alternatively or in addition, the intelligent EVSE unit 135 can be manually programmed with the safety buffer value 162. The intelligent EVSE unit 135 can automatically determine a buffer-reduced maximum installed power value 160 by reducing the maximum installed power load value 155 by the safety buffer value 162.

The intelligent EVSE unit 135 can determine a real time amount of power available for charging one or more electric vehicles 145 by periodically calculating a home-wide available power value 165. The home-wide available power value 165 can be determined as the difference between the buffer-reduced maximum installed power value 160 and the active power load value 150. In other words, the amount of power available 165 for charging the one or more electric vehicles 145 can be equal to or less than the buffer-reduced maximum installed power value 160 minus the active power load value 150.

The intelligent EVSE unit 135 can therefore safely allocate a corresponding amount of charging power to the one or more electric vehicles 145. Moreover, the intelligent EVSE unit 135 can periodically adjust the allocation of power to the one or more electric vehicles 145 based on changes over time in the home-wide available power value 165. As the various devices in the home 100 such as the appliances 140 and lights 125 change their power load requirements over time, so too can the intelligent EVSE unit 135 adjust its power allocation to charging the electric vehicle 145.

Figure 1B:
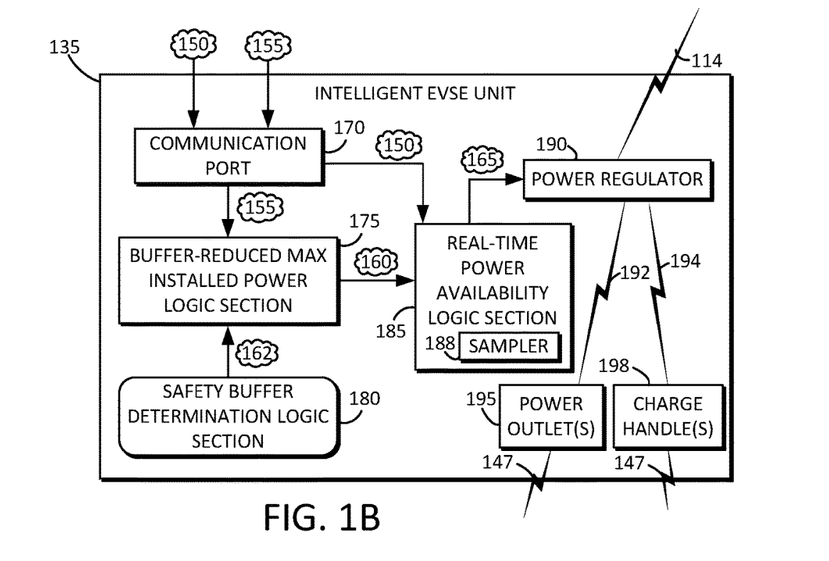
FIG. 1B illustrates some internal details of the example intelligent EVSE unit of FIG. 1A in accordance with various embodiments of the present invention.

FIG. 1B illustrates some internal details of the example intelligent EVSE unit 135 of FIG. 1A in accordance with various embodiments of the present invention. Reference is now made to FIGS. 1A and 1B. The intelligent EVSE unit 135 can include a communication port 170. The communication port 170 can receive the active power load value 150 and/or the maximum installed power load value 155 from the home power meter 105 via a communication link, such as the wireless link 116, the out-of-band wired connection 118, the electrical wiring 115, or by way of the power line 114 itself. The communication port 170 can provide the maximum installed power load value 155 to a buffer-reduced maximum installed power logic section 175. A safety buffer determination logic section 180 can generate the safety buffer value 162. The safety buffer value 162 can be 20%, 10%, 5%, or the like. The safety buffer determination logic section 180 can provide the safety buffer value 162 to the buffer-reduced maximum installed power logic section 175. Alternatively, the safety buffer value 162 can be received via the communication port 170, or otherwise manually set by a user of the intelligent EVSE unit 135. The buffer-reduced maximum installed power logic section 175 can automatically determine the buffer-reduced maximum installed power value 160 by reducing the maximum installed power load value 155 by the safety buffer value 162.

The intelligent EVSE unit 135 can include a real-time power availability logic section 185, which can receive the buffer-reduced maximum installed power value 160 from the buffer-reduced maximum installed power logic section 175. The communication port 170 can provide the active power load value 150 to the real-time power availability logic section 185. The real-time power availability logic section 185 can generate the home-wide available power value 165 dependent on the buffer-reduced maximum installed power value 160 and the active power load value 150. For example, the real-time power availability logic section 185 can determine a real time amount of power available for charging one or more electric vehicles 145 by periodically or continuously calculating the home-wide available power value 165. The real-time power availability logic section 185 can include a sampler logic section 188, which can take samples of, or otherwise determine, the home-wide available power value 165 at different sampling times, as explained in further detail below.

The home-wide available power value 165 can be determined as the difference between the buffer-reduced maximum installed power value 160 and the active power load value 150. In other words, the home-wide amount of power available 165 for charging the one or more electric vehicles 145 can be equal to or less than the buffer-reduced maximum installed power value 160 minus the active power load value 150.

The intelligent EVSE unit 135 can include a power regulator 190, which can receive the home-wide available power value 165 from the real-time power availability logic section 185. The power regulator 190 can limit the amount of power that is made available for charging via the intelligent EVSE unit 135. For example, the power regulator 190 can limit the amount of power that is made available to one or more power outlets 195 via power line 192. By way of another example, the power regulator 190 can limit the amount of power that is made available to one or more charge handles 198 via power line 194. The one or more electric vehicles 145 can be charged by connecting to the one or more power outlets 195 and/or one or more charge handles 198.

The real-time power availability logic section 185 can periodically or continually cause the power regulator 190 to adjust the allocation of power to the one or more electric vehicles 145 based on changes over time in the home-wide available power value 165. As the various devices in the home 100 such as the appliances 140 and lights 125 change their power load requirements over time, so too can the intelligent EVSE unit 135 adjust its power allocation to charging the electric vehicle 145. The intelligent EVSE unit 135 can therefore safely allocate a corresponding amount of charging power to the one or more electric vehicles 145.

Figure 2:
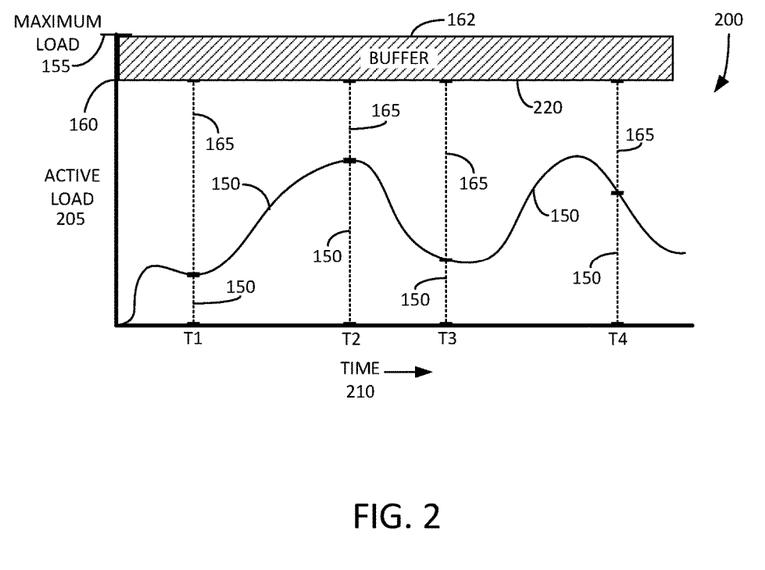
FIG. 2 illustrates an example graph of active load information versus time and a periodic energy distribution technique for the home in accordance with various embodiments of the present invention.

FIG. 2 illustrates an example graph 200 of active load value 205 shown in the Y-axis versus time 210 shown on the X-axis. A periodic energy distribution technique for the home 100 and electric vehicle 145 (of FIG. 1A) is illustrated in accordance with various embodiments of the present invention. The graph 200 shows the maximum installed power load value 155, the buffer-reduced maximum installed power value 160, and the active power load value 150. As can be seen, the maximum installed power load value 155 and the buffer-reduced maximum installed power value 160 generally remain constant, whereas the active power load value 150 varies over time depending on whether and which appliances 140 (of FIG. 1A), lighting 125 (of FIG. 1A), or the like, are currently drawing power. As can also be seen, the buffer-reduced maximum installed power value 160 can be determined by reducing the maximum installed power load value 155 by the safety buffer value 162, as described in detail above.

The intelligent EVSE unit 135 (of FIG. 1A) can periodically determine the home-wide available power value 165 at different sampling times T1, T2, T3, and T4, for example. The sampler logic section 188 (of FIG. 1A) can cause the real-time power availability logic section 188 to sample, or otherwise determine, the home-wide available power value 165 at the different sampling times. Alternatively or in addition, the intelligent EVSE unit 135 can continually determine the home-wide available power value 165 at any point in time along the entire curve 150. The amount of time between the sampling times T1, T2, T3, and T4 need not be the same, although in some embodiments, the sampling times T1, T2, T3, and T4 can be equally spaced. It will be understood that while four sampling times are shown, any suitable number of sampling times can be taken. At each sampling time T1, T2, T3, and T4, the intelligent EVSE unit 135 (of FIG. 1A) can determine the active power load value 150. For example, the home meter 105 (of FIG. 1A) can transmit the active power load value 150 to the intelligent EVSE unit 135, either wirelessly or via a wire. At each sampling time T1, T2, T3, and T4, the intelligent EVSE unit 135 can then determine the home-wide available power value 165 by subtracting the active power load value 150 from the buffer-reduced maximum installed power value 160. The intelligent EVSE unit 135 can then allocate an amount of power equal to or less than the home-wide available power value 165 to charging the electric vehicle 145 using, for example, an electric vehicle pilot or control signal. As time progresses, the intelligent EVSE unit 135 can adjust the amount of power allocated to charging the electric vehicle 145 (of FIG. 1A) according to changes in the home-wide available power value 165 for the home 100 (of FIG. 1A).

For example, at sampling time T1, the real-time power availability logic section 185 (of FIG. 1A) can determine the home-wide available power value 165 by subtracting the active power load value 150 from the buffer-reduced maximum installed power value 160. As can be seen at sampling time T1, the active power load value 150 is at a relatively low point, which means that the home-wide available power value 165 has a relatively higher value, and therefore, relatively more power can be made available for charging the one or more electric vehicles 145 through the intelligent EVSE unit 135. As can be seen at sampling time T2, the active power load value 150 is at a relatively high point, which means that the home-wide available power value 165 has a relatively lower value, and therefore, relatively less power can be made available for charging the one or more electric vehicles 145 through the intelligent EVSE unit 135. As can be seen at sampling time T3, the active power load value 150 is at a relatively mid-low point, which means that the home-wide available power value 165 has a relatively mid-high value, and therefore, relatively mid-high power can be made available for charging the one or more electric vehicles 145 through the intelligent EVSE unit 135. As can be seen at sampling time T4, the active power load value 150 is at a relatively mid-high point, which means that the home-wide available power value 165 has a relatively mid-low value, and therefore, relatively mid-low power can be made available for charging the one or more electric vehicles 145 through the intelligent EVSE unit 135.

Figure 3A:
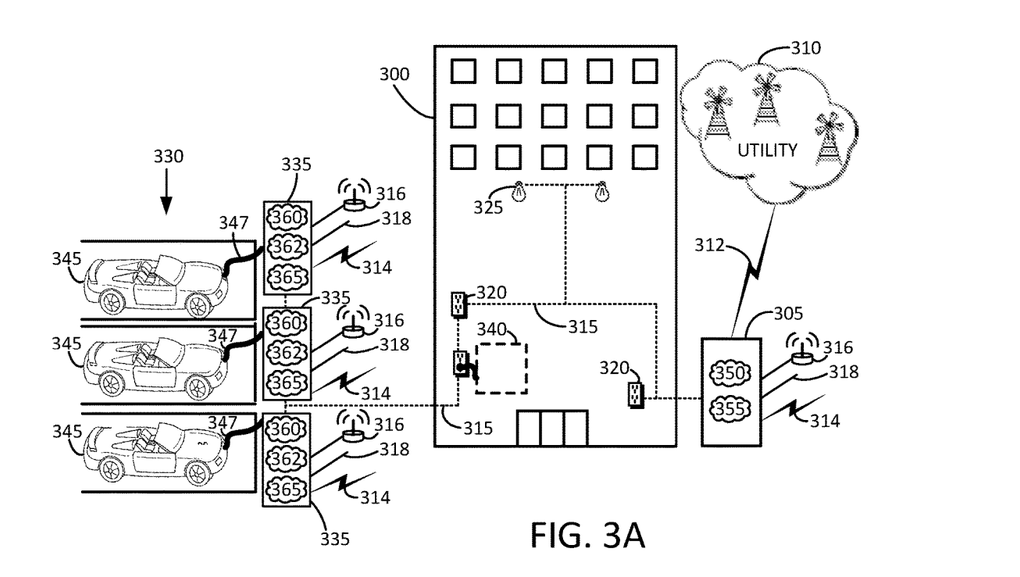
FIG. 3A illustrates an example block diagram of a building including electrical infrastructure and an intelligent EVSE unit in accordance with various embodiments of the present invention.

FIG. 3A illustrates an example block diagram of a building 300 including electrical infrastructure (e.g., 305, 315, 320, 325, and 340) and multiple intelligent electric vehicle supply equipment (EVSE) units 335 in accordance with various embodiments of the present invention. The building 300 can be an apartment building, a business building, a grocery store, a single-level parking garage, a multi-level parking garage, a skyscraper building, or the like. The building 300 can include a power meter 305. The building 300 can include multiple parking spaces 330. Each of the parking spaces 330 can have a corresponding intelligent EVSE unit 335 situated nearby. Alternatively, one intelligent EVSE unit 335 can be associated with two or more parking spaces 330. Each of the intelligent EVSE units 335 can be electrically and/or communicatively coupled to the building power meter 305. For example, each of the intelligent EVSE units 335 can be electrically and/or communicatively coupled to the building power meter 305 via the electrical wiring 315. Alternatively or in addition, each of the intelligent EVSE units 335 can be electrically coupled to the building power meter 305 via the electrical wiring 315, while each of the EVSE units 335 is communicatively coupled to the building power meter 305 through an out-of-band communication link. For example, each of the intelligent EVSE units 335 can be communicatively coupled to the building power meter 305 via an out-of-band communication link such as a wireless link 316 or out-of-band wired connection 318. In some embodiments, a direct electrical connection 314 exists between the building power meter 305 and each of the intelligent EVSE units 335. The building power meter 305 can be electrically coupled to a utility 310 via power line 312, which can generate power for use by the building 300.

The electrical infrastructure of the building 300 can include, for example, the building power meter 305, electrical wiring 315, plug outlets 320, lighting devices 325, appliances 340, or the like. It will be understood that other kinds of devices can be used such as circuit breakers, rectifiers, inverters, transformers, or the like (not shown).

Each of the intelligent EVSE units 335 can be electrically coupled to a corresponding electric vehicle 345 via a corresponding power cord 347. Each of the intelligent EVSE units 335 can be communicatively coupled to the building power meter 305 either wirelessly or via a wire. Each of the intelligent EVSE units 335 can receive an active power load value 350 from the building power meter 305. The active power load value 350 can indicate an instantaneous power level presently being delivered to the building 300. Each of the intelligent EVSE units 335 can receive a maximum installed power load value 355 from the building power meter 305. Alternatively or in addition, each of the intelligent EVSE units 335 can be manually programmed with the maximum installed power load value 355.

The maximum installed power load value 355 can include a maximum amount of power capable of being delivered via the electrical infrastructure of the building 300. For example, if the building 300 includes fifty (50) twenty (20) Amp circuits, then at one hundred twenty (120) Volts, the maximum installed power load can be 120 kVA (i.e., Kilo-watts). This is only a theoretical maximum since a safety buffer should exist such that the electrical infrastructure is not overloaded, which could otherwise cause a safety hazard. Each of the intelligent EVSE units 335 can automatically determine a safety buffer value 362 such as 20%. Alternatively or in addition, each of the intelligent EVSE units 335 can be manually programmed with the safety buffer value 362. Each of the intelligent EVSE units 335 can automatically determine a buffer-reduced maximum installed power value 360 by reducing the maximum installed power load value 355 by the safety buffer value 362.

In some embodiments, each of the intelligent EVSE units 335 can determine a real time amount of power available for charging one or more electric vehicles 345 by periodically calculating a building-wide available power value 365. The building-wide available power value 365 can be determined as the difference between the buffer-reduced maximum installed power value 360 and the active power load value 350. In other words, the amount of power available 365 for charging the one or more electric vehicles 345 can be equal to or less than the buffer-reduced maximum installed power value 360 minus the active power load value 350.

Each of the intelligent EVSE units 335 can therefore safely allocate a corresponding amount of charging power to the one or more electric vehicles 345. Moreover, each of the intelligent EVSE units 335 can periodically adjust the allocation of power to the one or more electric vehicles 345 based on changes over time in the building-wide available power value 365. As the various devices in the building 300 such as the appliances 340 and lights 325 change their power load requirements over time, so too can each of the intelligent EVSE units 335 adjust their power allocation to charging the electric vehicles 345. Similarly, as other intelligent EVSE units 335 consume different amounts of power at different times, which has an impact on the overall building-wide available power value 365, each of the intelligent EVSE units 335 can adjust their own power allocation to charging their own corresponding electric vehicles 345 accordingly.

Figure 3B:
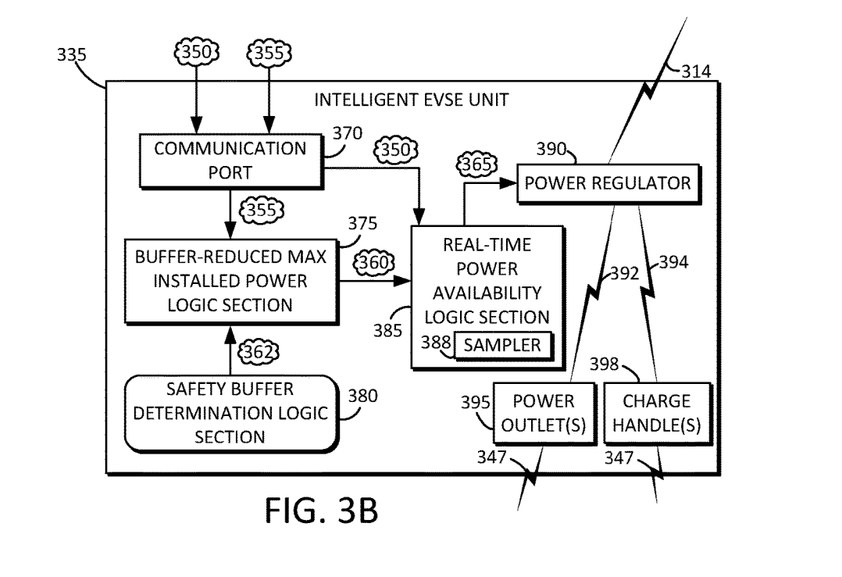
FIG. 3B illustrates some internal details of the example intelligent EVSE unit of FIG. 3A in accordance with various embodiments of the present invention.

FIG. 3B illustrates some internal details of the example intelligent EVSE unit of FIG. 3A in accordance with various embodiments of the present invention. Reference is now made to FIGS. 3A and 3B. Each of the intelligent EVSE units 335 can include a communication port 370. The communication port 370 can receive the active power load value 350 and/or the maximum installed power load value 355 from the building power meter 305 via a communication link, such as the wireless link 316, the out-of-band wired connection 318, the electrical wiring 315, or by way of the direct power line 314 itself. The communication port 370 can provide the maximum installed power load value 355 to a buffer-reduced maximum installed power logic section 375. A safety buffer determination logic section 380 can generate the safety buffer value 362. The safety buffer value 362 can be 20%, 10%, 5%, or the like. The safety buffer determination logic section 380 can provide the safety buffer value 362 to the buffer-reduced maximum installed power logic section 375. Alternatively, the safety buffer value 362 can be received via the communication port 370, or otherwise manually set by users of each of the intelligent EVSE units 335. The buffer-reduced maximum installed power logic section 375 can automatically determine the buffer-reduced maximum installed power value 360 by reducing the maximum installed power load value 355 by the safety buffer value 362.

Each of the intelligent EVSE units 335 can include a real-time power availability logic section 385, which can receive the buffer-reduced maximum installed power value 360 from the buffer-reduced maximum installed power logic section 375. The communication port 370 can provide the active power load value 350 to the real-time power availability logic section 385. The real-time power availability logic section 385 can generate the building-wide available power value 365 dependent on the buffer-reduced maximum installed power value 360 and the active power load value 350. For example, the real-time power availability logic section 385 can determine a real time amount of power available for charging one or more electric vehicles 345 by periodically or continuously calculating the building-wide available power value 365. The real-time power availability logic section 385 can include a sampler logic section 388, which can take samples of, or otherwise determine, the building-wide available power value 365 at different sampling times, as explained in further detail below.

The building-wide available power value 365 can be determined as the difference between the buffer-reduced maximum installed power value 360 and the active power load value 350. In other words, the amount of power available 365 for charging the one or more electric vehicles 145 can be equal to or less than the buffer-reduced maximum installed power value 360 minus the active power load value 350.

Each of the intelligent EVSE units 335 can include a power regulator 390, which can receive the building-wide available power value 365 from the real-time power availability logic section 385. The power regulator 390 can limit the amount of power that is made available for charging via the intelligent EVSE unit 335. For example, the power regulator 390 can limit the amount of power that is made available to one or more power outlets 395 via power line 392. By way of another example, the power regulator 390 can limit the amount of power that is made available to one or more charge handles 398 via power line 394. The one or more electric vehicles 345 can be charged by connecting to the one or more power outlets 395 and/or one or more charge handles 398.

The real-time power availability logic section 385 can periodically or continually cause the power regulator 390 to adjust the allocation of power to the one or more electric vehicles 345 based on changes over time in the building-wide available power value 365. As the various devices in the building 300 such as the appliances 340 and lights 325 change their power load requirements over time, so too can each of the intelligent EVSE units 335 adjust its power allocation to charging the electric vehicle 345. The intelligent EVSE units 335 can therefore safely allocate a corresponding amount of charging power to the one or more electric vehicles 345.

Figure 4:
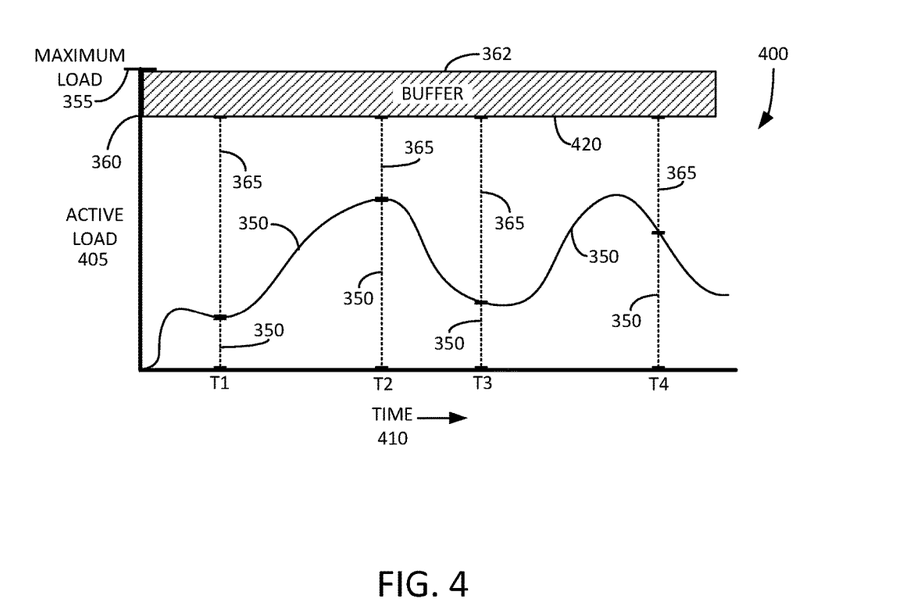
FIG. 4 illustrates an example graph of active load information versus time and a periodic energy distribution technique for the building in accordance with various embodiments of the present invention.

FIG. 4 illustrates an example graph 400 of active load value 405 shown in the Y-axis versus time 410 shown on the X-axis. A periodic energy distribution technique for the building 300 and electric vehicles 345 (of FIG. 3A) is illustrated in accordance with various embodiments of the present invention. The graph 400 shows the maximum installed power load value 355, the buffer-reduced maximum installed power value 360, and the active power load value 350. As can be seen, the maximum installed power load value 355 and the buffer-reduced maximum installed power value 360 generally remain constant, whereas the active power load value 350 varies over time depending on whether and which appliances 340 (of FIG. 3A), lighting 325 (of FIG. 3A), or the like, are currently drawing power. As can also be seen, the buffer-reduced maximum installed power value 360 can be determined by reducing the maximum installed power load value 355 by the safety buffer value 362.

Each of the intelligent EVSE units 335 (of FIG. 3A) can periodically determine the building-wide available power value 365 at different sampling times T1, T2, T3, and T4, for example. The sampler logic section 388 (of FIG. 3A) can cause the real-time power availability logic section 388 to sample, or otherwise determine, the building-wide available power value 365 at the different sampling times. The amount of time between the sampling times T1, T2, T3, and T4 need not be the same, although in some embodiments, the sampling times T1, T2, T3, and T4 can be equally spaced. It will be understood that while four sampling times are shown, any suitable number of sampling times can be taken. At each sampling time T1, T2, T3, and T4, each of the intelligent EVSE units 335 (of FIG. 3A) can determine the active power load value 350. For example, the building meter 305 (of FIG. 3A) can transmit the active power load value 350 to each of the intelligent EVSE units 335, either wirelessly or via a wire. At each sampling time T1, T2, T3, and T4, each of the intelligent EVSE units 335 can then determine the building-wide available power value 365 by subtracting the active power load value 350 from the buffer-reduced maximum installed power value 360. Each of the intelligent EVSE units 335 can then allocate an amount of power equal to or less than the building-wide available power value 365 to charging the corresponding electric vehicles 345 using, for example, an electric vehicle pilot or control signal. As time progresses, each of the intelligent EVSE units 335 can adjust the amount of power allocated to charging the electric vehicles 345 (of FIG. 3A) according to changes in the building-wide available power value 365 for the building 300 (of FIG. 3A).

For example, at sampling time T1, the real-time power availability logic section 385 (of FIG. 3A) can determine the building-wide available power value 365 by subtracting the active power load value 350 from the buffer-reduced maximum installed power value 360. As can be seen at sampling time T1, the active power load value 350 is at a relatively low point, which means that the building-wide available power value 365 has a relatively higher value, and therefore, relatively more power can be made available for charging the one or more electric vehicles 345 through the intelligent EVSE units 335. As can be seen at sampling time T2, the active power load value 350 is at a relatively high point, which means that the building-wide available power value 365 has a relatively lower value, and therefore, relatively less power can be made available for charging the one or more electric vehicles 345 through the intelligent EVSE units 335. As can be seen at sampling time T3, the active power load value 350 is at a relatively mid-low point, which means that the home-wide available power value 365 has a relatively mid-high value, and therefore, relatively mid-high power can be made available for charging the one or more electric vehicles 345 through the intelligent EVSE units 335. As can be seen at sampling time T4, the active power load value 350 is at a relatively mid-high point, which means that the home-wide available power value 365 has a relatively mid-low value, and therefore, relatively mid-low power can be made available for charging the one or more electric vehicles 345 through the intelligent EVSE units 335.

Figure 5:
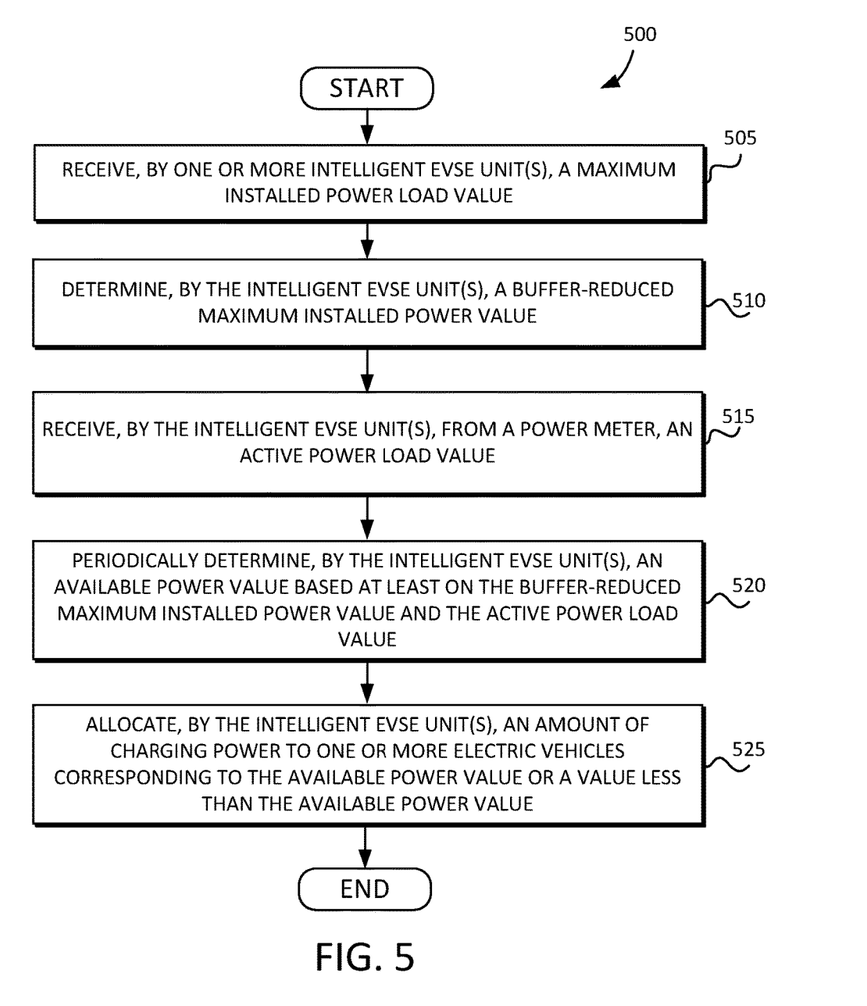
FIG. 5 shows a flow diagram illustrating a technique for monitoring power in a home or other building and distributing energy for charging one or more electric vehicles in accordance with embodiments of the present invention.

FIG. 5 shows a flow diagram 500 illustrating a technique for monitoring power in a home or other building and distributing energy for charging one or more electric vehicles in accordance with embodiments of the present invention.

The technique can begin at 505, where one or more intelligent EVSE unit(s) can receive a maximum installed power load value. At 510, the intelligent EVSE unit(s) can determine a buffer-reduced maximum installed power value based at least on the received maximum installed power load value and a built-in buffer. At 515, the intelligent EVSE unit(s) can receive, from a power meter of a home or building, an active power load value. At 520, the intelligent EVSE unit(s) can periodically determine an available power value based at least on the buffer-reduced maximum installed power value and the active power load value. At 525, the intelligent EVSE unit(s) can allocate an amount of charging power to one or more electric vehicles corresponding to the available power value or a value that is less than the available power value.

It will be understood that the steps illustrated in FIG. 5 need not be performed in the order shown, but rather, can be performed in a different order and/or with intervening steps.

Figure 6:
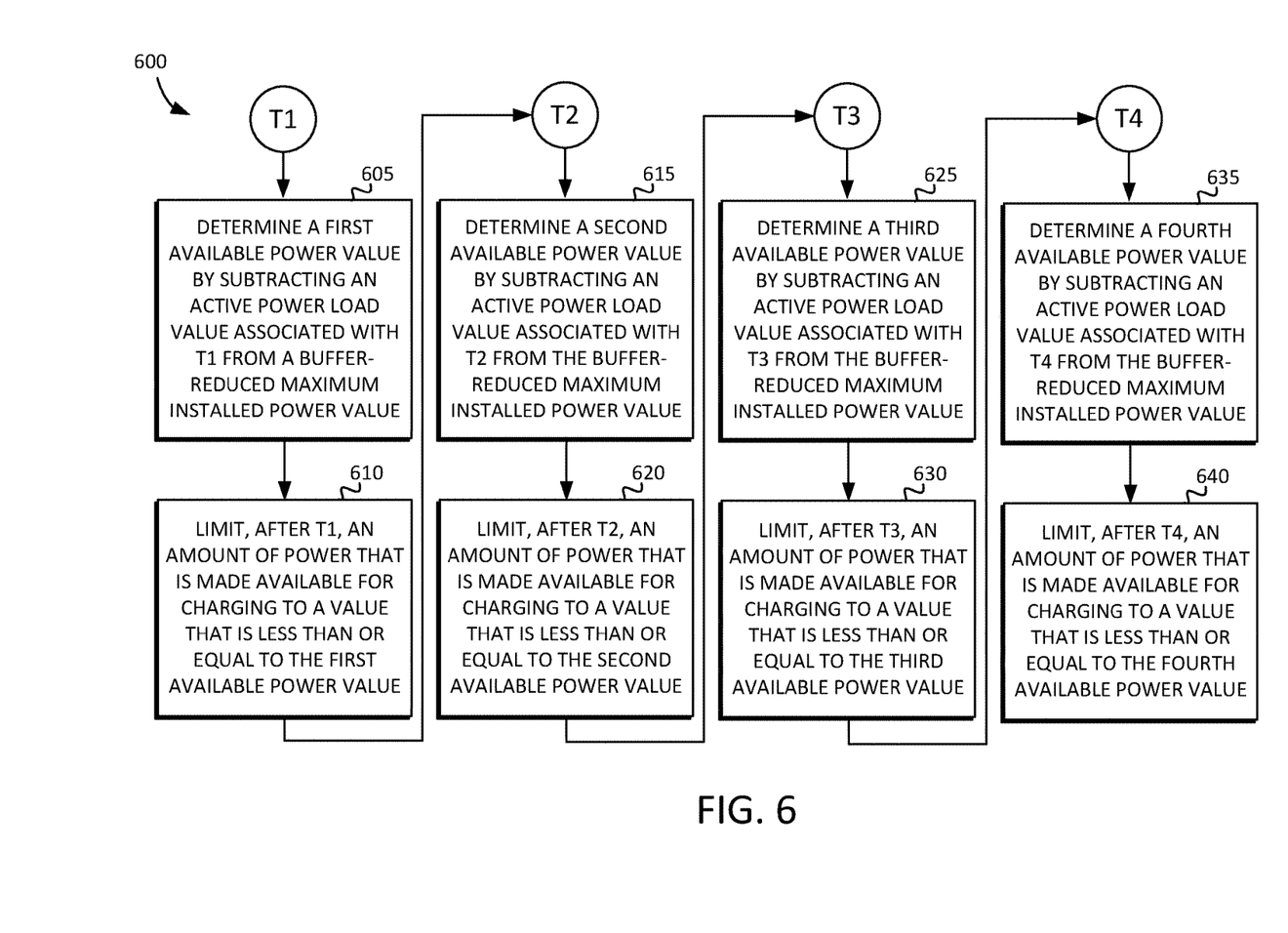
FIG. 6 shows a flow diagram illustrating a technique for intelligently allocating energy for charging one or more electric vehicles in accordance with embodiments of the present invention.

FIG. 6 shows a flow diagram 600 illustrating a technique for intelligently allocating energy for charging one or more electric vehicles in accordance with embodiments of the present invention.

The flow begins at time T1, where a real-time power availability logic section can determine at 605 a first available power value by subtracting an active power load value associated with T1 from a buffer-reduced maximum installed power value. At 610, a power regulator can limit, after time T1, an amount of power that is made available for charging electric vehicles to a value that is less than or equal to the first available power value.

The flow proceeds to time T2, where the real-time power availability logic section can determine at 615 a second available power value by subtracting an active power load value associated with T2 from the buffer-reduced maximum installed power value. At 620, the power regulator can limit, after time T2, an amount of power that is made available for charging electric vehicles to a value that is less than or equal to the second available power value.

The flow proceeds to time T3, where the real-time power availability logic section can determine at 625 a third available power value by subtracting an active power load value associated with T3 from the buffer-reduced maximum installed power value. At 630, the power regulator can limit, after time T3, an amount of power that is made available for charging electric vehicles to a value that is less than or equal to the third available power value.

The flow proceeds to time T4, where the real-time power availability logic section can determine at 635 a fourth available power value by subtracting an active power load value associated with T4 from the buffer-reduced maximum installed power value. At 640, the power regulator can limit, after time T4, an amount of power that is made available for charging electric vehicles to a value that is less than or equal to the fourth available power value.

It will be understood that the steps illustrated in FIG. 6 need not be performed in the order shown, but rather, can be performed in a different order and/or with intervening steps.

Some embodiments can include an intelligent EVSE unit. The intelligent EVSE unit can include a communication port configured to receive an active power load value and a maximum installed power load value from an external power meter, a safety buffer determination logic section configured to determine a safety buffer value, a buffer-reduced maximum installed power logic section configured to receive the safety buffer value from the safety buffer determination logic section, to receive the maximum installed power load value from the communication port, and to generate a buffer-reduced maximum installed power value dependent on the safety buffer value and the maximum installed power load value, and a real-time power availability logic section configured to receive the buffer-reduced maximum installed power value from the buffer-reduced maximum installed power logic section, to receive the active power load value from the communication port, and to generate an available power value dependent on the buffer-reduced maximum installed power value and the active power load value.

In some embodiments, the available power value is a home-wide available power value. In some embodiments, the available power value is a building-wide available power value.

The intelligent EVSE unit can include can further a power regulator configured to receive the available power value from the real-time power availability logic section. In some embodiments, the intelligent EVSE unit can include one or more charge handles. In some embodiments, the power regulator is configured to control an amount of power made available via the one or more charge handles dependent on the available power value.

In some embodiments, the intelligent EVSE unit can include one or more plug outlets. In some embodiments, the power regulator can be configured to control an amount of power made available via the one or more plug outlets dependent on the available power value.

In some embodiments, the real-time power availability logic section includes a sampler that is configured to periodically determine the available power value at different sampling times.

In some embodiments, the real-time power availability logic section is configured to determine the available power value at a first sampling time from among the different sampling times by subtracting the active power load value associated with the first sampling time from the buffer-reduced maximum installed power value.

In some embodiments, the available power value is referred to as a first available power value. In some embodiments, the real-time power availability logic section is configured to determine a second available power value at a second sampling time from among the different sampling times by subtracting the active power load value associated with the second sampling time from the buffer-reduced maximum installed power value.

In some embodiments, the real-time power availability logic section is configured to determine a third available power value at a third sampling time from among the different sampling times by subtracting the active power load value associated with the third sampling time from the buffer-reduced maximum installed power value.

The intelligent EVSE unit can further include a power regulator configured to receive the first available power value from the real-time power availability logic section, and to limit, after the first sampling time, an amount of power that is made available for charging to a value that is less than or equal to the first available power value.

In some embodiments, the power regulator is configured to receive the second available power value from the real-time power availability logic section, and to limit, after the second sampling time, the amount of power that is made available for charging to a value that is less than or equal to the second available power value.

In some embodiments, the power regulator is configured to receive the third available power value from the real-time power availability logic section, and to limit, after the third sampling time, the amount of power that is made available for charging to a value that is less than or equal to the third available power value.

The intelligent EVSE unit can further include an electrical connection configured to electrically connect the intelligent EVSE unit to the external power meter. In some embodiments, the communication port is configured to receive the active power load value and the maximum installed power load value from the external power meter via the electrical connection.

The intelligent EVSE unit can further include at least one of a wireless link or an out-of-band wired connection, wherein the communication port is configured to receive the active power load value and the maximum installed power load value from the external power meter via the at least one of the wireless link or the out-of-band wired connection.

In some embodiments, the intelligent EVSE unit further includes a power regulator configured to receive electrical power from external electrical wiring for charging one or more electric vehicles.

Embodiments can include a method for intelligently charging one or more electric vehicles using one or more intelligent EVSE units. The method can include receiving, by the one or more intelligent EVSE units, a maximum installed power load value. The method can include determining, by the one or more intelligent EVSE units, a buffer-reduced maximum installed power value. The method can include receiving, by the one or more intelligent EVSE units, an active power load value. The method can include periodically determining, by the one or more intelligent EVSE units, an available power value based at least on the buffer-reduced maximum installed power value and the active power load value.

In some embodiments, the method can include allocating, by the one or more intelligent EVSE units, an amount of charging power to one or more electric vehicles corresponding to the available power value or a value less than the available power value.

In some embodiments, receiving includes receiving, by a communication port, the maximum installed power load value and the active power load value from an external power meter. In some embodiments, determining includes generating, by a buffer-reduced max installed power logic section, the buffer-reduced maximum installed power value dependent on the maximum installed power load value. In some embodiments, periodically determining includes periodically sampling, by a sampler, the available power value at different sampling times, and periodically generating, by a real-time power availability logic section, the available power value based at least on the buffer-reduced maximum installed power value and the active power load value. In some embodiments, allocating includes allocating, by a power regulator, the amount of charging power to the one or more electric vehicles dependent on the periodically generated available power value.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices and units, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An intelligent electric vehicle supply equipment (EVSE) unit, comprising:
   a communication port configured to receive an active power load value and a maximum installed power load value from an external power meter;
   a safety buffer determination logic section configured to determine a safety buffer value;
   a buffer-reduced maximum installed power logic section configured to receive the safety buffer value from the safety buffer determination logic section, to receive the maximum installed power load value from the communication port, and to generate a buffer-reduced maximum installed power value dependent on the safety buffer value and the maximum installed power load value;
   a real-time power availability logic section configured to receive the buffer-reduced maximum installed power value from the buffer-reduced maximum installed power logic section, to receive the active power load value from the communication port, and to generate an available power value dependent on the buffer-reduced maximum installed power value and the active power load value;
   wherein the real-time power availability logic section includes a sampler that is configured to periodically determine the available power value at different sampling times; and
   wherein the real-time power availability logic section is configured to determine the available power value at a first sampling time from among the different sampling times by subtracting the active power load value associated with the first sampling time from the buffer-reduced maximum installed power value.

2. The intelligent EVSE unit of claim 1, wherein the available power value is a home-wide available power value.

3. The intelligent EVSE unit of claim 1, wherein the available power value is a building-wide available power value.

4. The intelligent EVSE unit of claim 1, further comprising a power regulator configured to receive the available power value from the real-time power availability logic section.

5. The intelligent EVSE unit of claim 4, further comprising:

one or more charge handles,
wherein the power regulator is configured to control an amount of power made available via the one or more charge handles dependent on the available power value.

6. The intelligent EVSE unit of claim 4, further comprising:
one or more plug outlets,
wherein the power regulator is configured to control an amount of power made available via the one or more plug outlets dependent on the available power value.

7. The intelligent EVSE unit of claim 1, wherein:
the available power value is referred to as a first available power value;
the real-time power availability logic section is configured to determine a second available power value at a second sampling time from among the different sampling times by subtracting the active power load value associated with the second sampling time from the buffer-reduced maximum installed power value; and
the real-time power availability logic section is configured to determine a third available power value at a third sampling time from among the different sampling times by subtracting the active power load value associated with the third sampling time from the buffer-reduced maximum installed power value.

8. The intelligent EVSE unit of claim 7, further comprising a power regulator configured to receive the first available power value from the real-time power availability logic section, and to limit, after the first sampling time, an amount of power that is made available for charging to a value that is less than or equal to the first available power value.

9. The intelligent EVSE unit of claim 8, wherein:
the power regulator is configured to receive the second available power value from the real-time power availability logic section, and to limit, after the second sampling time, the amount of power that is made available for charging to a value that is less than or equal to the second available power value; and
the power regulator is configured to receive the third available power value from the real-time power availability logic section, and to limit, after the third sampling time, the amount of power that is made available for charging to a value that is less than or equal to the third available power value.

10. The intelligent EVSE unit of claim 1, further comprising an electrical connection configured to electrically connect the intelligent EVSE unit to the external power meter.

11. The intelligent EVSE unit of claim 10, wherein the communication port is configured to receive the active power load value and the maximum installed power load value from the external power meter via the electrical connection.

12. The intelligent EVSE unit of claim 1, further comprising at least one of a wireless link or an out-of-band wired connection, wherein the communication port is configured to receive the active power load value and the maximum installed power load value from the external power meter via the at least one of the wireless link or the out-of-band wired connection.

13. The intelligent EVSE unit of claim 1, further comprising a power regulator configured to receive electrical power from external electrical wiring for charging one or more electric vehicles.

14. A method for intelligently charging one or more electric vehicles using one or more intelligent electric vehicle supply equipment (EVSE) units, the method comprising:
receiving, by the one or more intelligent EVSE units, a maximum installed power load value;
determining, by the one or more intelligent EVSE units, a buffer-reduced maximum installed power value;
receiving, by the one or more intelligent EVSE units, an active power load value; and
periodically determining, by the one or more intelligent EVSE units, an available power value based at least on the buffer-reduced maximum installed power value and the active power load value;
wherein periodically determining includes:
periodically sampling, by a sampler, the available power value at different sampling times; and
periodically generating, by a real-time power availability logic section, the available power value at a first sampling time from among the different sampling times by subtracting the active power load value associated with the first sampling time from the buffer-reduced maximum installed power value.

15. The method of claim 14, further comprising:
allocating, by the one or more intelligent EVSE units, an amount of charging power to one or more electric vehicles corresponding to the available power value or a value less than the available power value.

16. The method of claim 15, wherein:
receiving includes receiving, by a communication port, the maximum installed power load value and the active power load value from an external power meter;
determining includes generating, by a buffer-reduced max installed power logic section, the buffer-reduced maximum installed power value dependent on the maximum installed power load value; and
allocating includes allocating, by a power regulator, the amount of charging power to the one or more electric vehicles dependent on the periodically generated available power value.

* * * * *